US011387721B2

(12) United States Patent
Miyawaki et al.

(10) Patent No.: US 11,387,721 B2
(45) Date of Patent: Jul. 12, 2022

(54) COIL SEGMENT POSITIONING METHOD, COIL SEGMENT POSITIONING TOOL, AND COIL SEGMENT POSITIONING APPARATUS

(71) Applicant: ODAWARA ENGINEERING CO., LTD., Kanagawa (JP)

(72) Inventors: Noburo Miyawaki, Kanagawa (JP); Ryo Honda, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 5 days.

(21) Appl. No.: 17/026,943

(22) Filed: Sep. 21, 2020

(65) Prior Publication Data

US 2021/0006140 A1   Jan. 7, 2021

Related U.S. Application Data

(63) Continuation of application No. PCT/JP2019/012226, filed on Mar. 22, 2019.

(30) Foreign Application Priority Data

Mar. 22, 2018   (JP) .............................. JP2018-055374

(51) Int. Cl.
*H02K 15/06* (2006.01)
*H02K 15/00* (2006.01)

(52) U.S. Cl.
CPC ....... *H02K 15/062* (2013.01); *H02K 15/0087* (2013.01); *Y10T 29/49009* (2015.01)

(58) Field of Classification Search
CPC .. H02K 3/04; H02K 3/12; H02K 3/14; H02K 15/0031; H02K 15/0056; H02K 15/0062;
(Continued)

(56) References Cited

U.S. PATENT DOCUMENTS

| 2014/0007415 A1 | 1/2014 | Corbinelli |
| 2019/0036428 A1 | 1/2019 | Murata |
| 2020/0153319 A1 | 5/2020 | Reiser |

FOREIGN PATENT DOCUMENTS

| EP | 2684283 A1 | 1/2014 |
| EP | 2684283 B1 | 1/2015 |

(Continued)

OTHER PUBLICATIONS

Extended European Search Report issued in European Appln. No. 19770309.3 dated Apr. 28, 2021.
(Continued)

*Primary Examiner* — Peter Dungba Vo
*Assistant Examiner* — Joshua D Anderson
(74) *Attorney, Agent, or Firm* — Rossi, Kimms & McDowell LLP

(57) ABSTRACT

An example of a positioning apparatus has a base member configured to support a stator core, a positioning tool disposed on its upper surface, and a driving mechanism for driving it. The positioning tool has a first plate and a second plate. The first plate has an inner side ring and an annular plate body fixed to the upper surface thereof, and the second plate has an outer side ring and a plate body fixed to the upper surface thereof. Insertion holes each configured to accept insertion of one of distal end pairs are formed on the plate bodies, respectively, and positioning is performed by rotating these plate bodies in opposite directions. Positions of the distal end pairs are aligned in the radial direction without the positioning tool, and then the positioning tool is set.

10 Claims, 12 Drawing Sheets

(58) Field of Classification Search
CPC ........... H02K 15/0068; H02K 15/0081; H02K 15/0087; H02K 15/0428; H02K 15/062; H02K 15/063; H02K 15/064; Y10T 29/49009; Y10T 29/49012; H01R 43/0263

See application file for complete search history.

(56) References Cited

FOREIGN PATENT DOCUMENTS

| JP | 2003259613 A | 9/2003 |
| JP | 2005130577 A | 5/2005 |
| JP | 2005224028 A | 8/2005 |
| JP | 4114588 B2 | 7/2008 |
| JP | 2015171260 A | 9/2015 |
| WO | 2012119691 A1 | 9/2012 |
| WO | 2017159864 A1 | 9/2017 |
| WO | 2019007459 A1 | 1/2019 |

OTHER PUBLICATIONS

English translation of Written Opinion issued in Intl. Appln. No. PCT/JP2019/012226 dated May 14, 2019, previously cited in IDS filed Sep. 21, 2020.
International Preliminary Report on Patentability issued in Intl. Appln. No. PCT/JP2019/012226 dated Oct. 1, 2020 English translation provided.
International Search Report issued in Intl. Appln. No PCT/JP2019/012226 dated May 14, 2019 English translation provided.
Written Opinion issued in Intl. Appln. No. PCT/JP2019/012226 dated May 14, 2019.
Observations by a third party issued in European Appln. No. 19770309.3 mailed Jun. 18, 2021.
Office Action issued in European Appln. No. 19770309.3 dated Jan. 13, 2022.

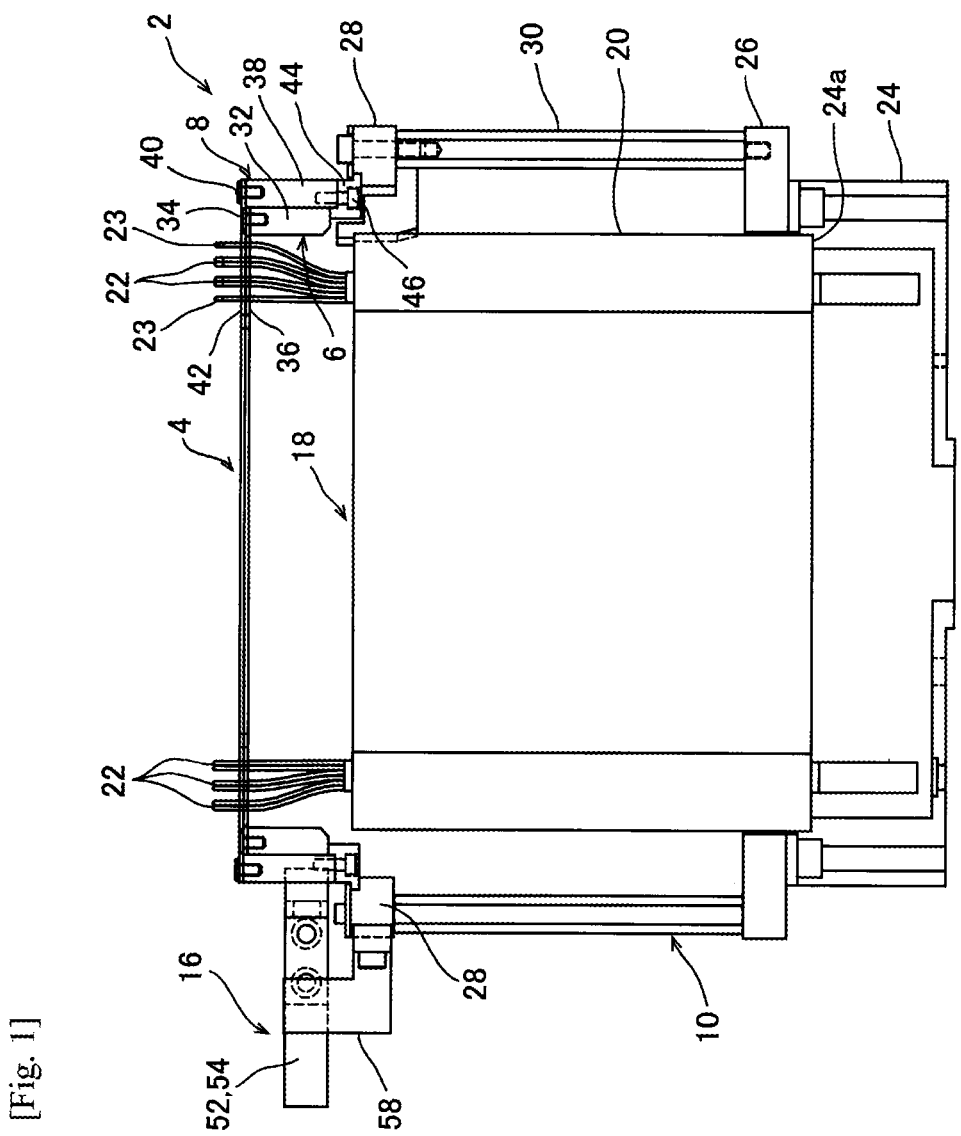
[Fig. 1]

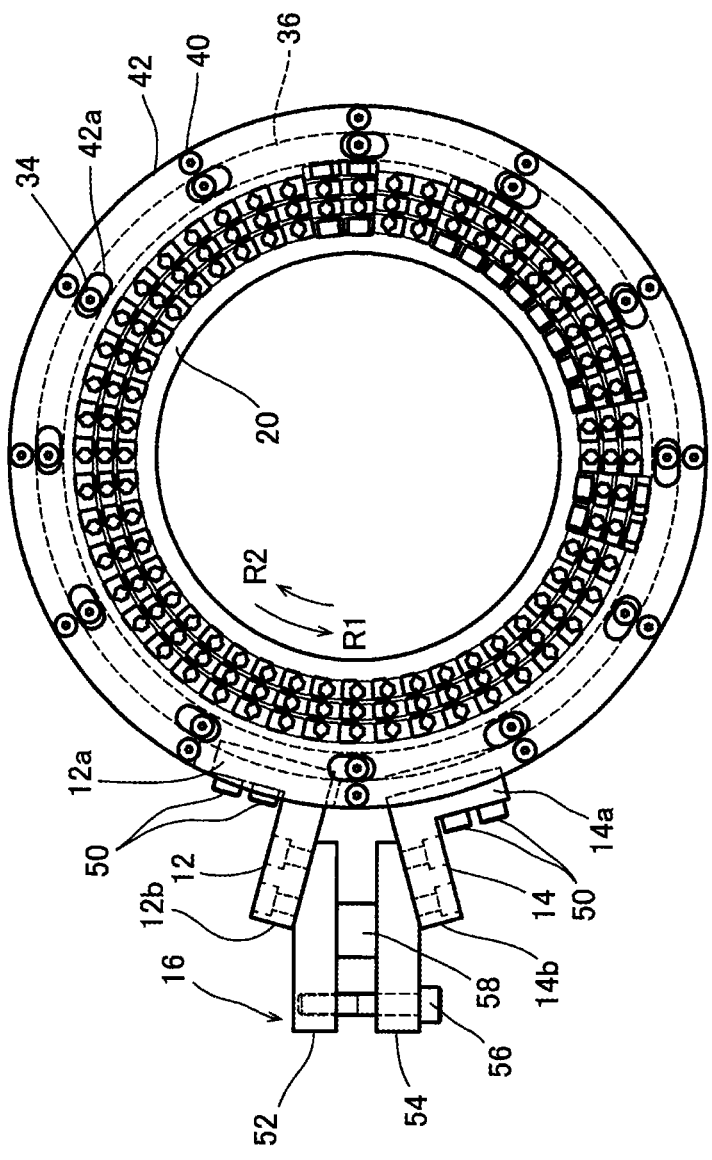
[Fig. 2]

[Fig. 3]
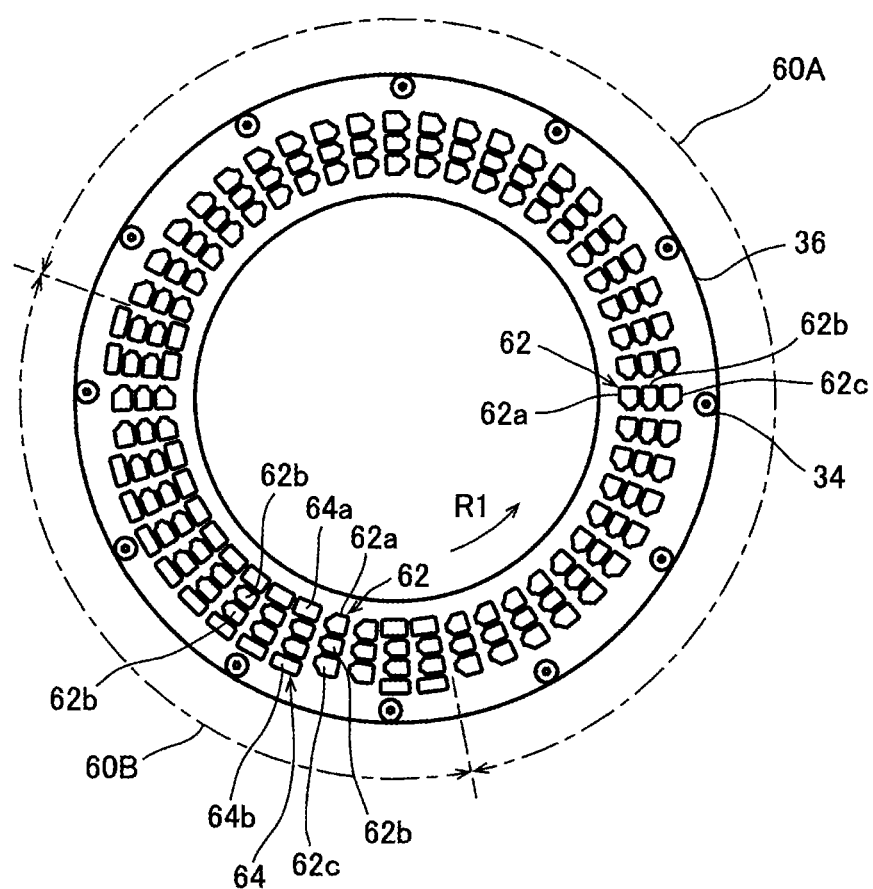

[Fig. 4]
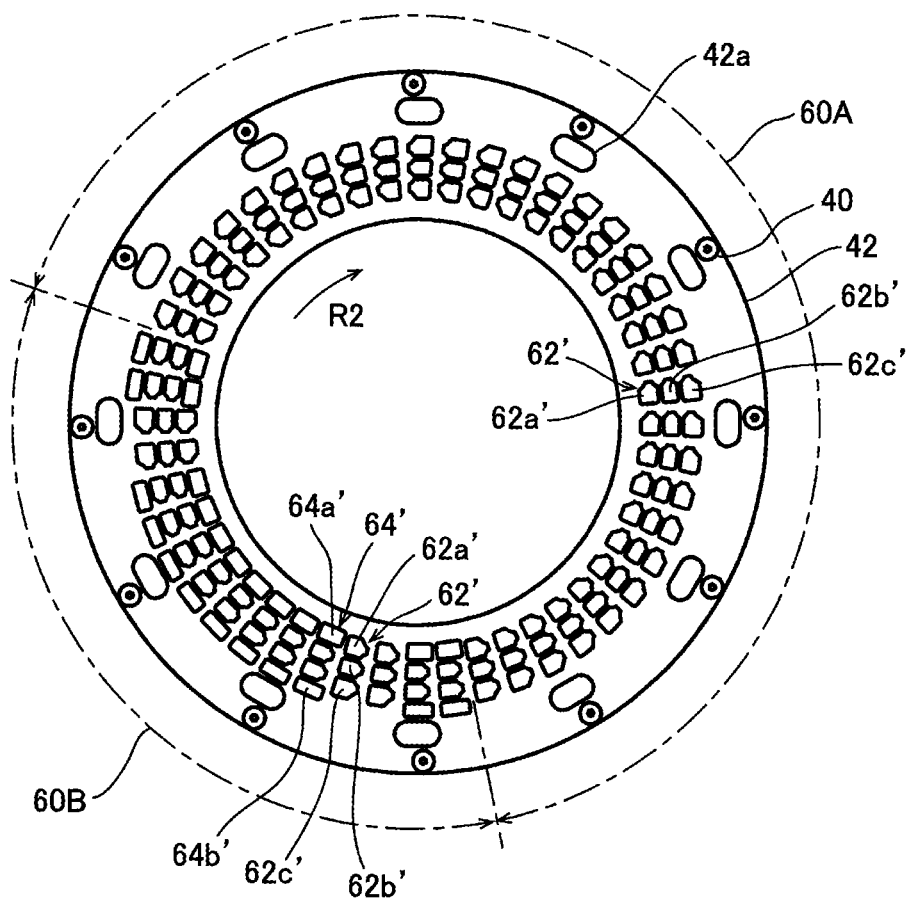

[Fig. 5]
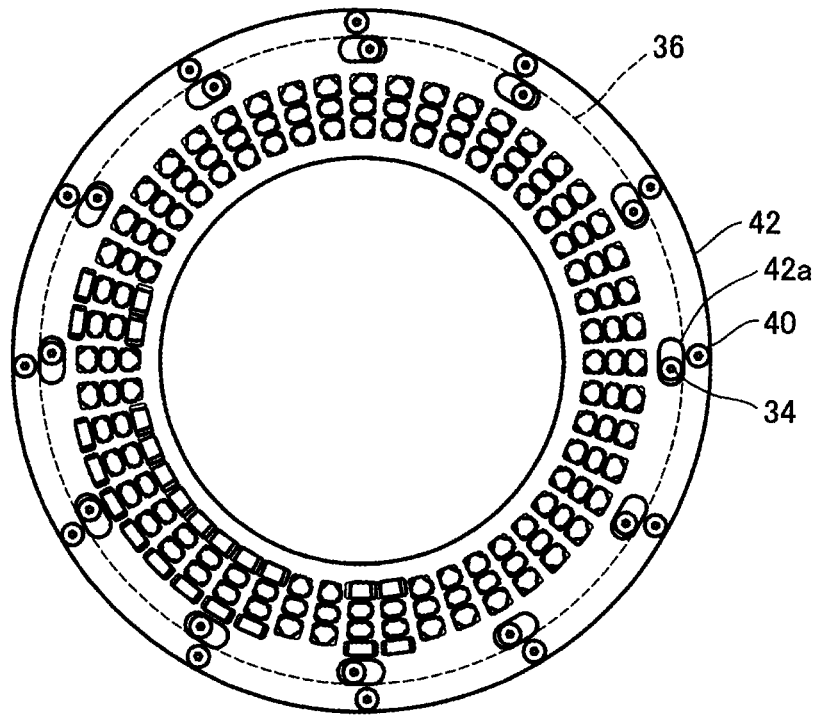
[Fig. 6]
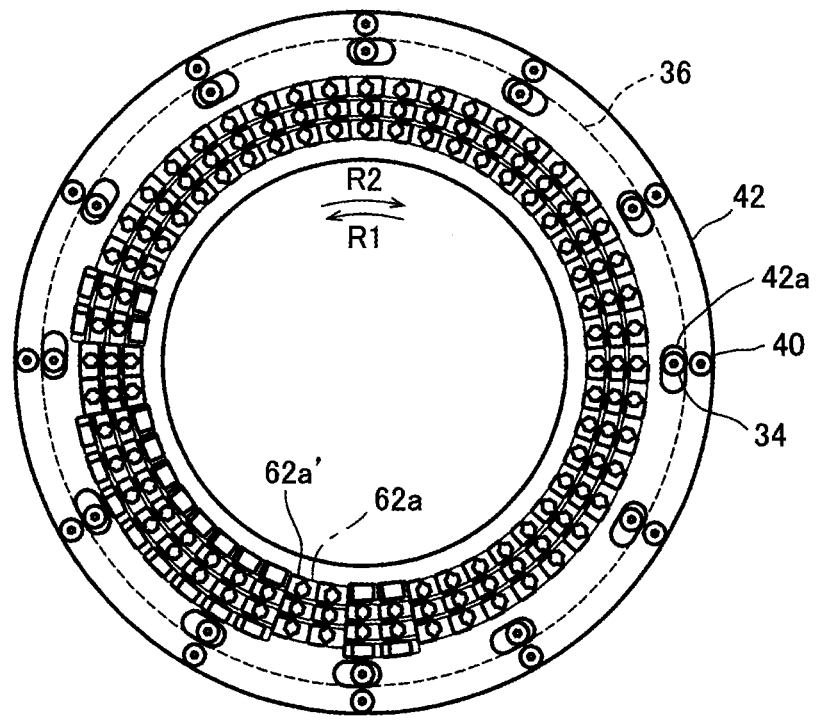

[Fig. 7A]
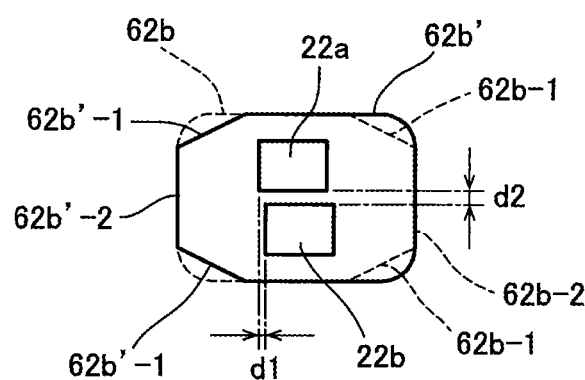
[Fig. 7B]
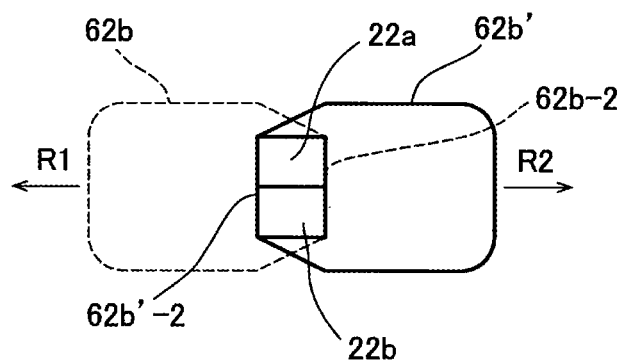

[Fig. 8A]
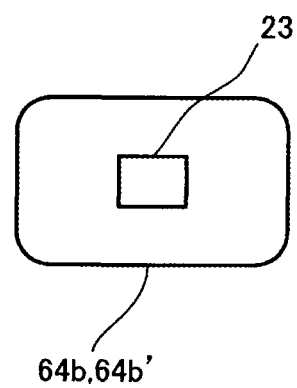
64b,64b'
[Fig. 8B]
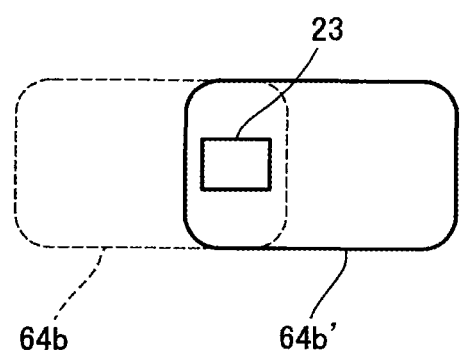
64b    64b'

[Fig. 9]
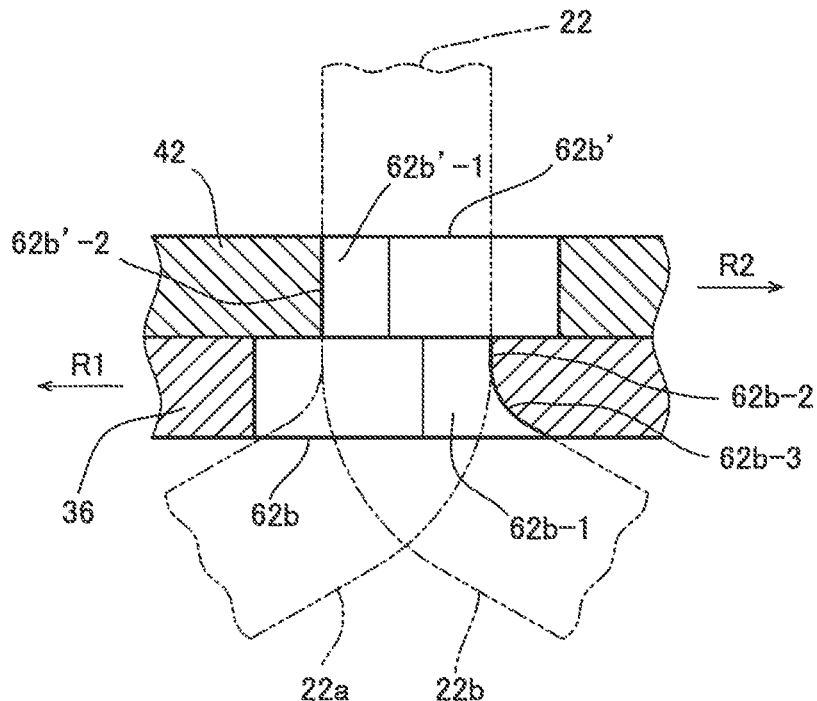
[Fig. 10]
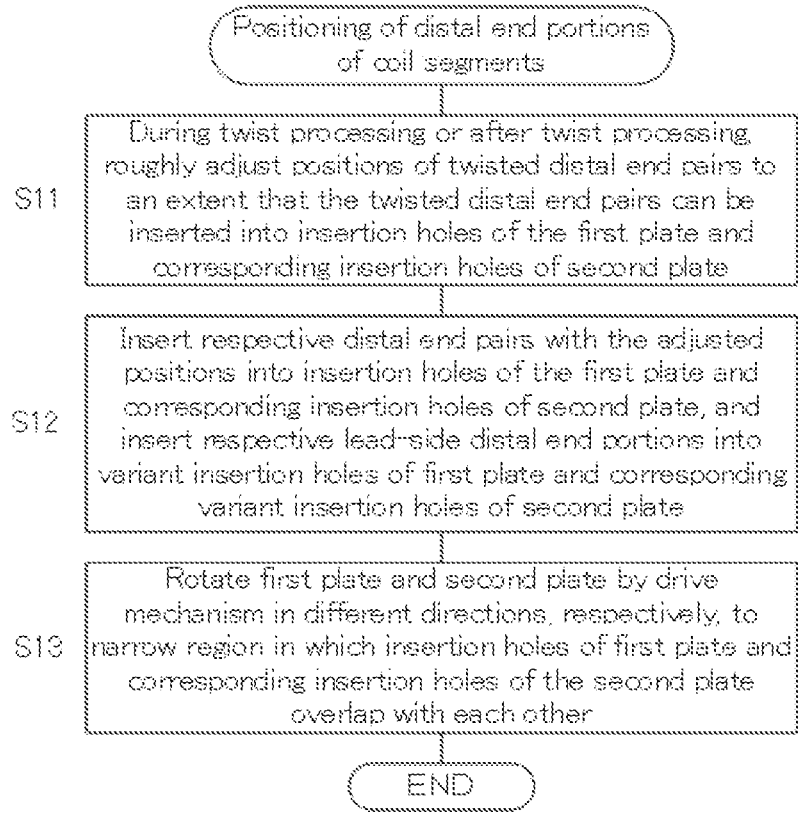

[Fig. 11]
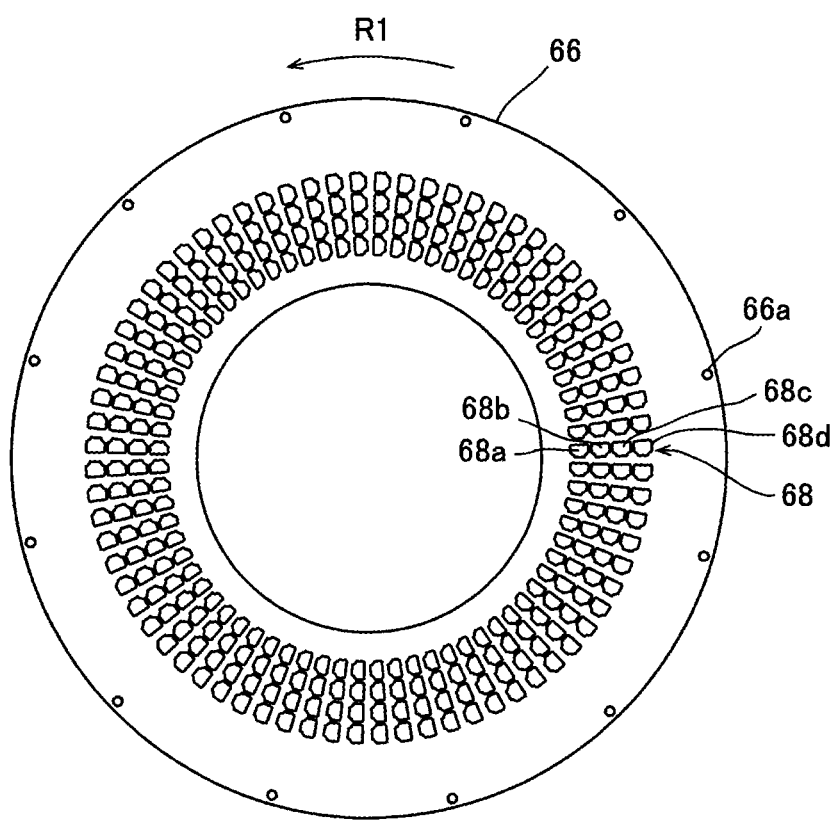

[Fig. 12]
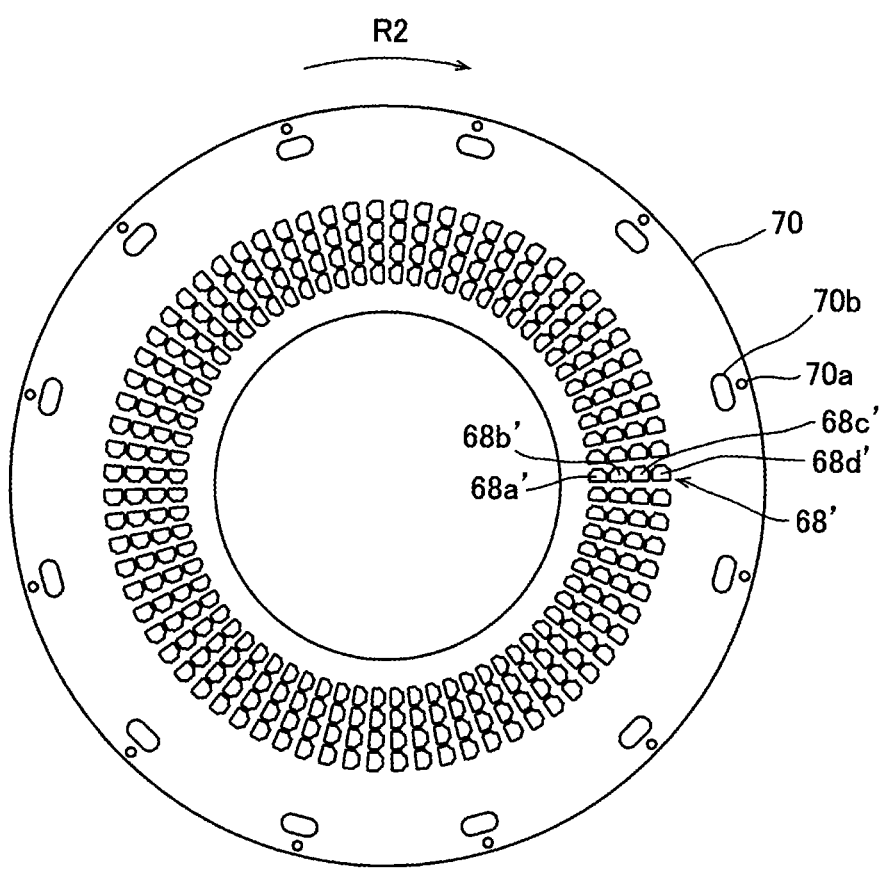

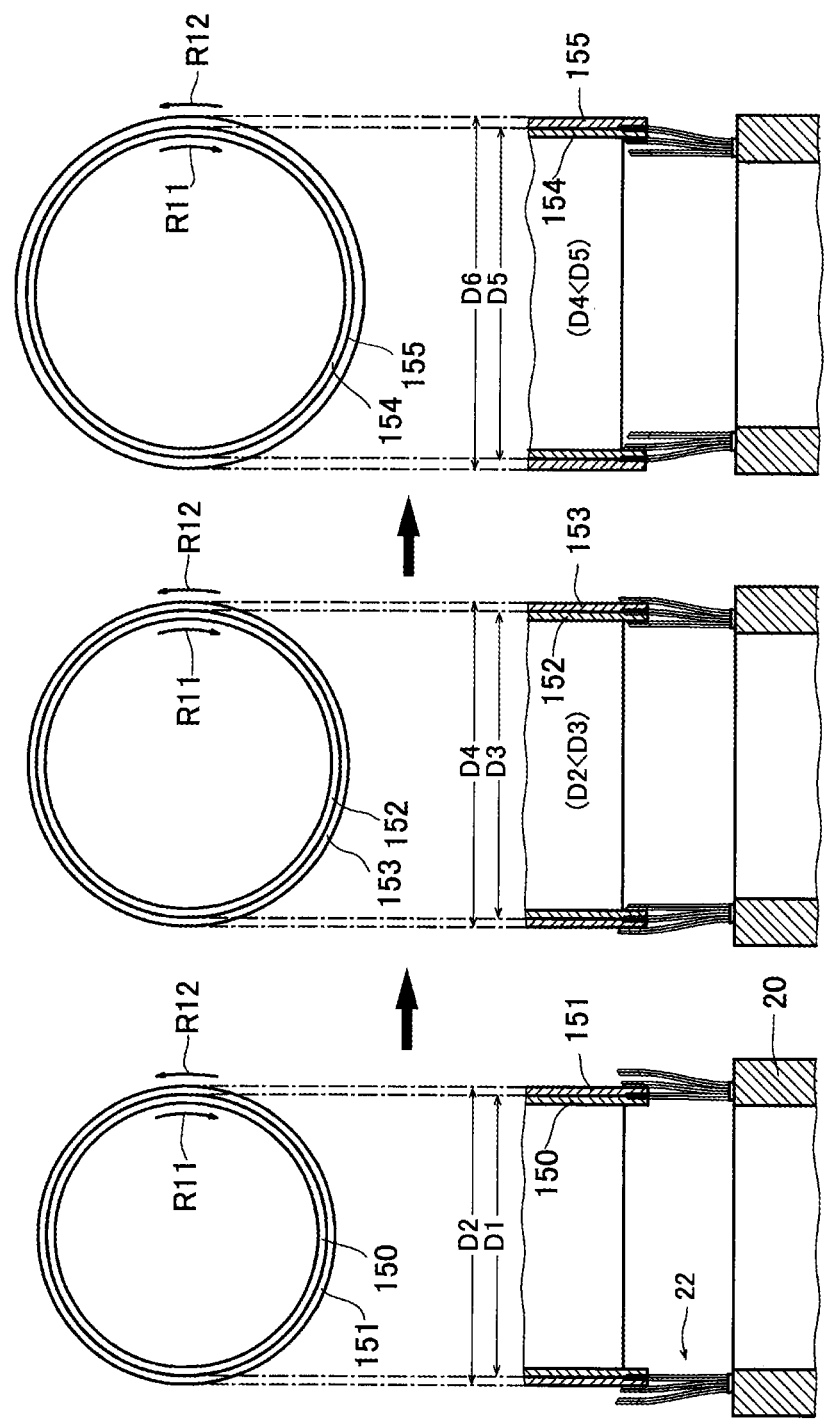
[Fig. 13]

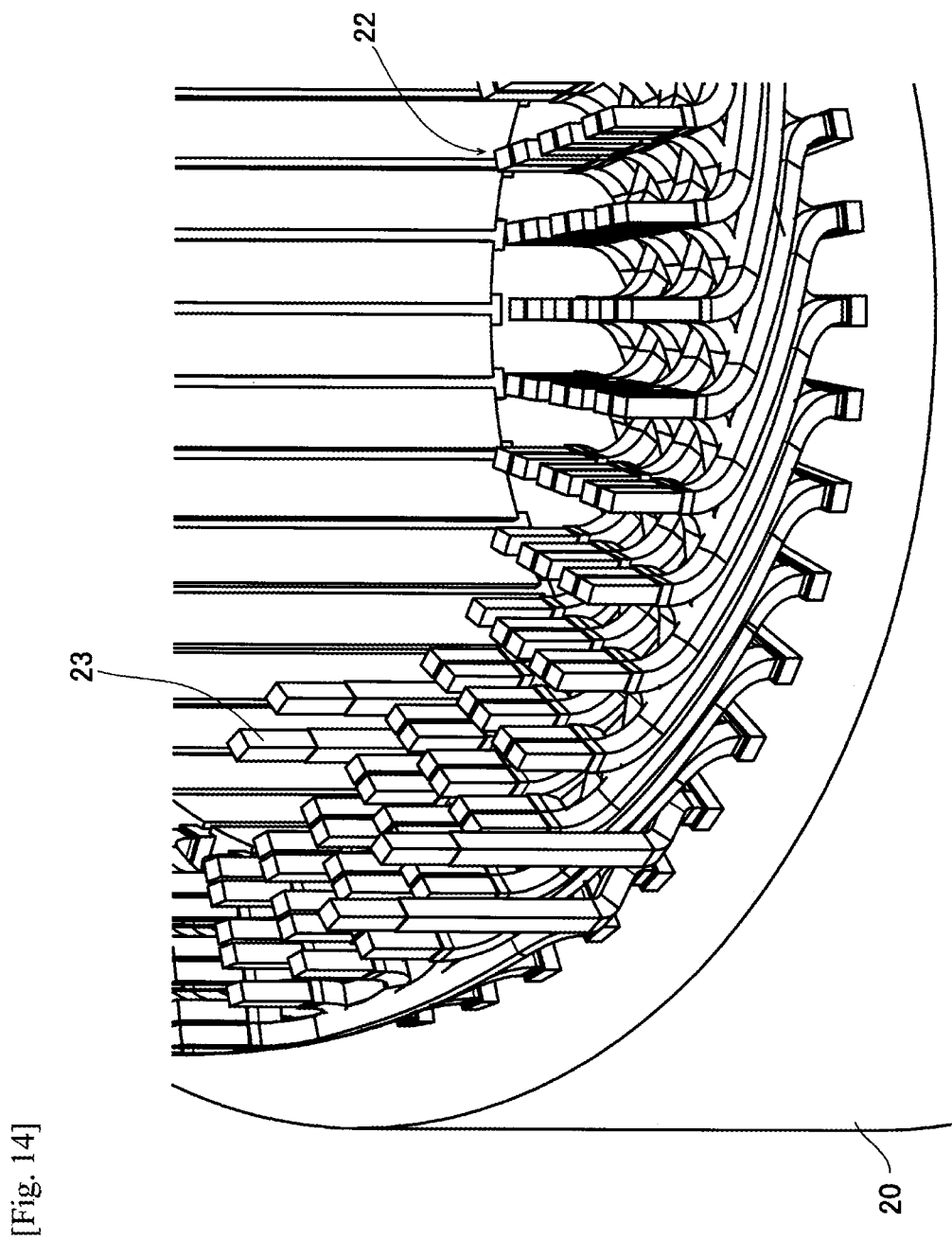
[Fig. 14]

COIL SEGMENT POSITIONING METHOD, COIL SEGMENT POSITIONING TOOL, AND COIL SEGMENT POSITIONING APPARATUS

TECHNICAL FIELD

The present invention relates to a coil segment positioning method for positioning distal end portions of coil segments constituting a coil used in an electrical rotating machine such as a motor or a generator, or in an electromagnetic machine such as a transformer, and to a coil segment positioning tool and a coil segment positioning apparatus.

BACKGROUND ART

For example, in a stator of an electrical rotating machine, it is known that a coil with a plurality of coil segments connected one another in series is formed by: inserting the coil segments, each formed by bending a rectangular flat wire into a U-shape, into slots of the core; twisting layers, neighboring in the radial direction of the core, of distal end potions in the insertion direction of the coil segments that are protruding from an end face of the core, in opposite directions along the circumferential direction; and electrically connecting the distal end potions facing each other in the radial direction.

The distal end portions in the insertion direction of the coil segments, that are free end sides, are formed to be peeled-off portions in which an insulating film made of enamel, polyimide resin, or the like is peeled-off in advance, and the peeled-off portions are joined with each other by arc welding, laser welding, or the like in a state where the peeled-off portions are in contact with each other in the radial direction of the core.

Coil segments constituting this type of coils include ordinary coil segments that are merely units of constitution of the coils, and coil segments for leads to be electrically connected to a power supply terminal, an output terminal, or a common conductor.

An ordinary coil segment has a pair of slot insertion portions (straight portions) of the same length in the U-shape, and a coil segment for a lead is, for example, a variant segment in which only one of the slot insertion portions thereof is long.

Hereinafter, the ordinary coil segments are referred to as ordinary segments, and the coil segments for leads are referred to as variant segments.

A pair of distal end portions of a coil segment protruding from an end face of the core are located in layers adjacent to each other in the radial direction of the core, and bent diagonally in opposite directions along the circumferential direction of the core, respectively (twist processing). In the twist processing, the peeled-off portions are kept in linear shapes along the axial direction of the core.

By electrically connecting the peeled-off portions (synonymous with weld ends) facing each other in the radial direction of the core after the bending, it is possible to form a coil in which coil segments are connected in series, wound on the core by substantially one turn.

Furthermore, so-called layer transfer can be made by connecting a coil segment at the end of the first turn with a coil segment at the beginning of the second turn. By repeating this connection, it is possible to form a coil in which annular arrangements of the coil segments are connected in series, wound on the core by a plurality of turns.

Prior to the welding between the peeled-off portions of the coil segments, misalignment along the circumferential direction of the core between the peeled-off portions facing each other is corrected (alignment), and misalignment therebetween along the radial direction of the core is corrected (butting).

PTL1 proposes a segment positioning apparatus that uses two annular plates each having insertion windows each configured to accept insertion of a segment end pair (a pair of peeled-off portions) facing each other, and performs positioning of a plurality of segment end pairs along the circumferential direction and the radial direction of the core at once by rotating the respective plates in opposite directions to constrain the segment end pairs.

The insertion windows of each of the plates have an opening in a shape corresponding to the shape of the slots, and the insertion windows are arranged in the number corresponding to the number of the slots. Accordingly, a segment end pair group constituted by the number of end portions of the segments arranged in one slot is inserted into one insertion window.

Further, the edges of the insertion windows of the plates configured to approach each other when the plates are rotated are formed with projections at opposite positions thereof, and the segment end pairs are sandwiched and restrained in regions partitioned by overlaps between the projections, thereby the positioning is performed.

CITATION LIST

Patent Literature

[PTL1] Japanese Patent No. 4,114,588

SUMMARY OF INVENTION

Technical Problem

According to the configuration of PTL1, since each insertion window is opened as a single hole configured to accept insertion of all the end portions of the segments disposed in one slot, even if there is some variability among positions of some segment end pair facing each other in the radial direction of the core after the twisting process, it is possible to insert the segment end pair group to be inserted.

However, when inserted in a state where there is some variability among the positions of the segment end pairs, each segment end pair will not always be accurately positioned into the region partitioned by the projections, and actually it is often a problem that the projections intrude into a segment end pair to be welded with each other and accordingly the end portions of the pair are separated.

Therefore, after inserting the segment end pair groups into the insertion windows, a positioning process for correcting the positional deviation of each segment end pair so that each segment end pair is positioned in the region partitioned by the projections is required.

However, after inserting the segment end pairs into the insertion windows of the plates, the height of the segment end pairs protruding from the upper surface of the plate is low, and since the plates exist as obstacles, the positioning operation must be performed in a narrow space, and the work is very complicated and troublesome.

In addition, since the positioning operation is performed in accordance with the regions partitioned by the projections, the operation is further limited, which deteriorates the complexity and troublesomeness.

Further, in this type of positioning, thickness of the plates cannot be large in consideration of their function. The configuration disclosed in PTL1 has a problem that the mechanical strength is low because the ratio of openings of the insertion windows to the areas of the plates is large.

The present invention has been developed in view of the above situation, and it is an object of the present invention to improve working efficiency of positioning of distal end portions of coil segments and to improve strength of a member for the positioning.

Solution to Problem

To achieve the above object, the present invention performs rough positional adjustment in a state where the positional adjustment of distal end pairs constituted by a pair of distal end portions facing each other in the radial direction of the core can be easily performed, and by utilizing the aligned property, aligns the positions of the distal end portions constituting each distal end pair using a member having insertion holes each configured to separately accept insertion of each distal end pair, thereby achieving both of improvement of the working efficiency of the positioning and improvement of the strength of the positioning member.

That is, a coil segment positioning method of the present invention is a coil segment positioning method for positioning a plurality of distal end pairs of coil segments protruding from an end face of a core, each of the distal end pairs being constituted by a pair of distal end portions facing each other in a radial direction of the core among distal end portions of the coil segments, the method including: preparing a first member with first insertion holes each configured to separately accept insertion of one of the distal end pairs, the first insertion holes being arranged in lines along a circumferential direction of the core to form a plurality of rows in the radial direction, and a second member with second insertion holes corresponding to the first insertion holes of the first member; inserting the respective distal end pairs with positions thereof adjusted to an extent that the distal end pairs can be inserted into the first insertion holes and the second insertion holes, into the first insertion holes of the first member and the second insertion holes of the second member, while disposing the second member to overlap with the first member in an axial direction of the core; and aligning positions, in the circumferential direction, of the distal end portions constituting the respective distal end pairs being inserted into the first insertion holes and the second insertion holes, by rotating the first member and/or the second member around an axis of the core to narrow a region in which the first insertion holes and the second insertion holes overlap with each other in the axial direction of the core.

In such a positioning method, it is conceivable that the first member and the second member are rotated in opposite directions to each other to narrow the region in which the first insertion hole and the second insertion hole overlap with each other in the axial direction of the core.

Further, it is conceivable that at least either of the first insertion holes and the second insertion holes are formed such that widths of the at least either insertion holes, in the radial direction, are narrower on rear sides thereof in a direction of rotation of said at least either insertion holes according to the rotation of the first member and/or the second member than on front sides thereof in the direction of the rotation, and when aligning the positions, in the circumferential direction, of the distal end portions constituting each distal end pair by the rotating of the first member and/or the second member, the aligned distal end portions are brought into contact with each other in the radial direction.

Further, it is conceivable that one or more stand-alone distal end portions not constituting the distal end pairs are included in the distal end portions of the coil segments protruding from the end face of the core, one or more third insertion holes each configured to accept insertion of one of the stand-alone distal end portions are formed on the first member, and one or more fourth insertion holes each configured to accept insertion of one of the stand-alone distal end portions are formed on the second member, and that when inserting the respective distal end pairs with positions thereof adjusted, into the first insertion holes and the second insertion holes, the respective stand-alone distal end portions are inserted into the third insertion holes and the fourth insertion holes, and that positions of the respective stand-alone distal end portions are not affected by the rotation of the first member and/or the second member.

Further, it is conceivable that inner surfaces of either of the first insertion holes and the second insertion holes, which are closer to the core when the distal end pairs are inserted thereinto, are configured to extend backward with respect to a direction of rotation of said either insertion holes according to the rotation of the first member and/or the second member, on a side closer to the core.

Further, a positioning tool of the present invention includes: a first member with first insertion holes each configured to separately accept insertion of one of distal end pairs each constituted by a pair of distal end portions facing each other in a radial direction of a core among distal end portions of coil segments protruding from an end face of the core, the first insertion holes being arranged in lines in a circumferential direction of the core to form a plurality of rows in the radial direction; and a second member with second insertion holes corresponding to the first insertion holes of the first member, configured to be disposed to overlap with the first member in an axial direction of the core in a state where the respective distal end pairs are inserted into the first insertion holes and the second insertion holes, wherein the first member and/or the second member is rotatable around an axis of the core in a direction to narrow a region in which the first insertion holes and the second insertion holes overlap with each other in the axial direction of the core.

In such a positioning device, it is conceivable that both of the first member and the second member are rotatable in directions to each other to narrow the region in which the first insertion hole and the second insertion hole overlap with each other in the axial direction of the core.

Further, it is conceivable that at least either of the first insertion holes and the second insertion holes are formed such that widths of the at least either insertion holes, in the radial direction, are narrower on rear sides thereof in a direction of rotation of said at least either insertion holes according to the rotation of the first member and/or the second member than on front sides thereof in the direction of the rotation.

Furthermore, it is conceivable that the first member comprises one or more third insertion holes each configured to accept insertion of one of one or more stand-alone distal end portions that are distal end portions not constituting the distal end pairs among the distal end portions of the coil segments protruding from the end face of the core, and the second member comprises one or more fourth insertion holes each configured to accept insertion of one of the stand-alone distal end portions.

Further, it is conceivable that inner surfaces of either of the first insertion holes and the second insertion holes, which come closer to the core when the distal end pairs are inserted thereinto, are configured to extend backward with respect to a direction of rotation of said either insertion holes according to the rotation of the first member and/or the second member, on a side closer to the core.

A positioning apparatus of the present invention includes any one of the above-described positioning tools, and a drive mechanism configured to rotate the first member and the second member in different directions, respectively.

In such a positioning apparatus, it is preferable that the apparatus further includes: a base member configured to support the first member and the second member to be rotatable; a first operable member formed on the first member; and a second operable member formed on the second member, and that the drive mechanism is configured to rotate the first member and the second member in the different directions by moving the first operable member and the second operable member closer to each other or away from each other.

Effect of the Invention

According to the present invention, it is possible to improve working efficiency of positioning of distal end portions of coil segments and to improve strength of a member for the positioning.

BRIEF DESCRIPTION OF DRAWINGS

FIG. 1 is a schematic cross-sectional view of a positioning apparatus according to an embodiment of the present invention.

FIG. 2 is a plan view of a main part of a positioning tool in the positioning apparatus shown in FIG. 1.

FIG. 3 is a plan view of a plate body of a first plate in the positioning tool shown in FIG. 2.

FIG. 4 is a plan view of a plate body of a second plate in the positioning tool shown in FIG. 2.

FIG. 5 is a plan view showing the plate body of the second plate shown in FIG. 4 superimposed on the plate body of the first plate shown in FIG. 3, in a state before positioning.

FIG. 6 is a plan view showing a positioning state in which the first plate and the second plate are rotated in opposite directions from the state shown in FIG. 5.

FIG. 7A is a view showing a positioning operation, and showing an overlapping state between an insertion hole in the first plate and a corresponding insertion hole in the second plate.

FIG. 7B is a diagram showing a state after performing the positioning from the state of FIG. 7A.

FIG. 8A is a view showing relationship between a distal end portion of a variant segment and a variant insertion hole in the positioning operation, and showing an overlapping state between a variant insertion hole in the first plate and a corresponding variant insertion hole in the second plate.

FIG. 8B is a view showing a state after performing the positioning from the state of FIG. 8A.

FIG. 9 is a cross-sectional view showing the overlapping state between the insertion hole in the first plate and the corresponding insertion hole in the second plate at the time of the positioning.

FIG. 10 is a flowchart showing steps of an embodiment of a positioning method of the present invention.

FIG. 11 is a plan view of a plate body of a first plate in another example.

FIG. 12 is a plan view of a plate body of a second plate in another example.

FIG. 13 is a diagram for explaining twist processing of the distal end portions of the coil segments.

FIG. 14 is a diagram showing an example of the distal end portions of the coil segments after the twist processing.

DESCRIPTION OF EMBODIMENTS

Hereinafter embodiments of the present invention will be described with reference to the drawings.

Referring to FIG. 1 and FIG. 2, a positioning apparatus and a positioning tool according to an embodiment of the present invention will be described.

The positioning apparatus 2 has: the positioning tool 4; a base member 10 for rotatably supporting a first plate 6 and a second plate 8 of the positioning tool 4; a first operable member 12 for rotating the first plate 6; a second operable member 14 for rotating the second plate 8; and a drive mechanism configured to rotate the first operable member 12 and the second operable member 14 in different directions by moving the first operable member 12 and the second operable member 14 closer to each other or away from each other. The positioning apparatus 2 and the positioning tool 4 are embodiments of the positioning apparatus and the positioning tool of the present invention, respectively. The first plate 6 and the second plate 8 are examples of the first member and the second member, respectively.

On the base member 10, a stator core 18 that is an example of a workpiece is supported such that distal end pairs 22 of coil segments protruding from an end face of a core 20 are positioned upward.

The base member 10 has: a cylindrical base body 24 configured to support the lower end of the core 20 by a mounting surface 24a; a flange 26 fixed to the upper surface of the base body 24; a support ring 28 supporting the positioning tool 4; and a plurality of props 30 disposed between the flange 26 and the support ring 28 at intervals in the circumferential direction of the core 20.

The first plate 6 has an inner side ring 32 and an annular plate body 36 fixed to the upper surface of the inner side ring 32 by screws 34.

The second plate 8 has an outer side ring 38 and an annular plate body 42 fixed to the upper surface of the outer side ring 38 by screws 40.

On the lower surface of the outer side ring 38, a pedestal ring 44 for supporting the lower end of the inner side ring 32 is fixed by screws 46.

The pedestal ring 44 is supported by the stepped surface of the support ring 28 of the base member 10, and thereby each of the first plate 6 and the second plate 8 is supported rotatably with respect to the base member 10.

As shown in FIG. 2, the first operable member 12 is formed in an L-shape including a fixing piece 12a extending in the circumferential direction of the core 20, and an operation piece 12b extending in the radial direction of the core 20. The fixing piece 12a is fixed to the inner side ring 32 shown in FIG. 1 by two screws 50.

The second operable member 14 is similarly formed in an L-shape including a fixing piece 14a extending in the circumferential direction of the core 20, and an operation piece 14b extending in the radial direction of the core 20. The fixing piece 14a is fixed to the outer side ring 38 shown in FIG. 1 by two screws 50.

The drive mechanism 16 has: a drive piece 52 fixed to the operation piece 12b of the first operable member 12; a drive piece 54 fixed to the operation piece 14b of the second operable member 14; and a drive screw 56 constituted by a long bolt screwed to the drive piece 52 through the drive piece 54.

Between the drive piece 52 and the drive piece 54, a spacing member 58 fixed to the support ring 28 shown in FIG. 1 is disposed. The position where the drive piece 52 and the drive piece 54 are in contact with the spacing member 58 is a position for the positioning by the positioning tool 4.

When the drive screw 56 is rotated to increase the screwing amount (to be more deeply screwed) into the drive piece 52, the plate body 36 of the first plate 6 rotates in one direction (R1 direction) along the circumferential direction of the core 20, and the plate body 42 of the second plate 8 rotates in the opposite direction (R2 direction), simultaneously. When the drive screw 56 is rotated to decrease the screwing amount (to be more shallowly screwed) into the drive piece 52, the plate body 36 and the plate body 42 respectively rotate in the reverse directions of the above case.

In the plate body 42 of the second plate 8, elongated holes 42a are formed at intervals in the circumferential direction of the core 20 so that the heads of the screws 34 fixing the plate body 36 of the first plate 6 can move in the elongated holes 42a. Accordingly, the plate body 36 and the plate body 42 are arranged so as to vertically overlap with each other, i.e. so as to overlap in the axial direction of the core 20, and are relatively rotatable around the axis of the core 20 within an angular range corresponding to the range of the elongated holes 42a in the circumferential direction.

FIG. 2 shows a state where the drive screw 56 has been rotated to increase the screwing amount into the drive piece 52 until the drive piece 52 and the drive piece 54 are in contact with the spacing member 58. This corresponds to a state where a region in which later-described insertion holes respectively formed in the plate bodies 36 and 42 overlap with each other is narrowed and positioning of the distal end pairs 22 has been performed.

Rotation of the drive screw 56 may be performed automatically by a drive source such as a motor, or may be performed manually with a tool or the like.

In a coil formed by inserting U-shaped coil segments into slots arranged radially in the circumferential direction of the core 20, as described above, distal end portions protruding from the end face of the core 20 are twisted along the circumferential direction layer by layer, the layers neighboring one another in the radial direction of the core, and distal end portions facing each other in the radial direction are electrically connected.

When the U-shaped coil segments are inserted into the slots, there is some variability among the positions of the distal end portions, and thus the distal end portions cannot be inserted into twist jigs used in the twist processing as they are. Accordingly, generally, an operation to align the positions of the distal end portions in each layer in the radial direction is performed before performing the twist processing, and then the twist processing is performed.

If the accuracy of the twisting apparatus is sufficiently high, at the time of performing the twist processing, the position of each distal end portion of each coil segment can be simultaneously adjusted to a certain position such that each distal end portion faces, in the radial direction of the core 20, another distal end portion of another coil segment that is a partner for the connection by welding or the like, to form a distal end pair, and that the distal end pair can be inserted into later-described insertion holes.

That is, after the twist processing, as shown in FIG. 1, the gaps between the distal end pairs 22 in the radial direction is substantially constant. In FIG. 1, the reference numeral 23 shows a lead-side distal end portion of a variant segment (a coil segment for a lead). The gap in the radial direction between the distal end pair 22 of the ordinary segment and the lead-side distal end portion 23 of the variant segment can also be made substantially constant at the same time as the twist processing. Incidentally, as shown in FIG. 1, the lead-side distal end portion is an independent distal end portion which does not constitute a distal end pair with another distal end portion.

Incidentally, since the precise positional adjustment of the respective distal end portions constituting the distal end pairs is performed with the positioning tool 4, it is sufficient that the positional adjustment at this stage is performed as a relatively rough positional adjustment with an accuracy to an extent that the respective distal end pairs and the lead-side distal end portions can be inserted into the later-described insertion holes.

Such twist processing can be performed using, for example, as shown in FIG. 13, twisting jigs 150 to 155 respectively corresponding to the layers (six layers in the example of FIG. 13) formed by the distal end portions of the coil segments, having a diameter of D1 to D6, and having accommodating portions for accommodating distal end portions of the coil segments of the corresponding layer. For example, every two layers in order from the inside can be twisted, in a state where the respective distal end portions of the coil segments of the two layers are inserted into respective accommodating portions of two twisting jigs corresponding to the two layers, by rotating the two twist jigs in opposite directions as indicated by arrows R11 and R12.

Thus, among the distal end portions of the coil segments of the respective layers protruding from the end face of the core 20, the portions close to the end face of the core 20 can be twisted in opposite directions for each layer, while keeping the upright state at portions of a predetermined length on the distal end side accommodated in the accommodating portion of the twisting jigs 150 to 155. Further, by moving the lead-side distal end portion 23 aside to a certain position not to be accommodated in the accommodating portion during the twist processing, the lead-side distal end portion 23 can be excluded from the twist processing.

FIG. 14 shows an example of the distal end portions of the coil segments after the above twist processing.

In addition, the method of twist processing is not limited to the above, and for example, the method described in Japanese Patent Application Laid-Open Publication No. 2003-259613 can be used.

However, in either case, if the accuracy of the twisting apparatus is not sufficient, positional deviation may occur between the distal end portions facing each other in the radial direction of the core 20 and constituting the distal end pairs after the twist processing. The positional deviation may be a deviation in a sense that a pair of distal end portions to constitute a distal end pair are not sufficiently close to each other, or a deviation in a sense that position of a distal end pair is not aligned with the insertion hole, or both of them.

To eliminate such positional deviation and to facilitate and ensure insertion of the distal end pairs to the later-described insertion holes, a radial alignment operation may be performed on the distal end pairs 22 after the twist processing, before performing positioning with the positioning tool 4. This alignment operation can be performed using a known method as appropriate, for example, employing a positioning mechanism described in Japanese Patent Application Laid-Open Publication No. 2005-224028. It is preferable to perform an alignment operation suitable for possible positional deviations that may occur, depending on the characteristics of the twisting apparatus. For example, if the deviation in the radial spacing between the distal end pairs is likely to occur, it is preferable to perform radial spacing alignment as the alignment operation.

Such alignment operation after the twist processing is preferably performed in a space with less interference before the positioning tool 4 is set. Further, the alignment operation may be performed as a relatively rough positional adjustment with an accuracy to an extent that the respective distal end pairs and the lead-side distal end portions can be inserted into the later-described insertion holes. Circumferential alignment may be included.

The positioning tool 4 is a positioning tool for positioning the distal end portions constituting the respective distal end pairs 22, before making connection, by welding or the like, on each of the distal end pairs 22 each constituted by a pair of distal end portions facing each other in the radial direction of the core 20 among the distal end portions of the coil segments protruding from the end face of the core 20.

The specific configuration and operation of the positioning tool 4 will be described below.

FIG. 3 is a plan view of the plate body 36 of the first plate 6. The reference numeral 60A denotes an ordered region corresponding to a portion in which only the ordinary segments protrude from the core 20, and the reference numeral 60B denotes a mixed region corresponding to a portion in which both the ordinary segments and the variant segments protrude from the core 20.

In the ordered region 60A, insertion holes 62 (first insertion holes) each configured to separately accept insertion of one of the distal end pairs 22 of the ordinary segments are formed in lines along the circumferential direction of the core 20 to form a plurality of rows (three rows here) in the radial direction of the core 20.

The insertion holes 62 include three types of: insertion holes 62*a* in the inner row in the radial direction; insertion holes 62*b* in the center row; and insertion holes 62*c* in the outer row. The inner insertion holes 62*a* and the outer insertion holes 62*c* have a larger width in the radial direction than the center insertion holes 62*b*. This is to make it easier, even if only slightly, to insert the distal end pairs 22 into the respective insertion holes 62*a* to 62*c* in consideration of the case where the positions of the distal end pairs 22 still somewhat miss the correct positions at the time of the insertion into the insertion holes.

Further, these insertion holes 62*a*, 62*b*, 62*c* have a tapered shape such that the width of the insertion holes in the radial direction of the core 20 gradually narrows on the rear end side along the rotation direction (R1 direction) of the plate body 36 at the time of the positioning.

In the mixed region 60B, both of insertion holes 62*a*, 62*b*, 62*c* each configured to separately accept insertion of one of the distal end pairs 22 of the ordinary segments, and variant insertion holes 64 (third insertion holes) each configured to accept insertion of a lead-side distal end portion 23 of a variant segment are formed.

The variant insertion holes 64 are in rectangular shapes, and include two types of: inner variant insertion holes 64*a* having a larger width in the radial direction; and outer variant insertion holes 64*b* elongated in the circumferential direction. Since the variant insertion holes 64 do not have a positioning function, they do not have a tapered shape.

FIG. 4 is a plan view of the plate body 42 of the second plate 8. In the plate body 42, corresponding insertion holes 62' (62*a*', 62*b*', 62*c*') (second insertion holes) respectively corresponding to the insertion holes 62 (62*a*, 62*b*, 62*c*) of the plate body 36, and corresponding variant insertion holes 64' (64*a*', 64*b*') (fourth insertion holes) respectively corresponding to the variant insertion holes 64 (64*a*, 64*b*) are formed. The corresponding insertion holes 62' are ones to perform the positioning of the distal end pairs in cooperation with the insertion holes 62, and for example, the corresponding insertion holes 62' have the same shapes as the insertion holes 62 and orientations in the circumferential direction opposite to those of the insertion holes 62. Since the corresponding variant insertion holes 64' do not have a positioning function, there is no difference in direction from the insertion holes 64.

FIG. 5 shows a state in which the plate body 42 of the second plate 8 is superimposed on the plate body 36 of the first plate 6 in the axial direction of the core 20 (insertion direction of the distal end pairs 22). In this state, a region in which the insertion holes 62 and the corresponding insertion holes 62' overlap with each other and the variant insertion holes 64 and the corresponding variant insertion holes 64' overlap with each other is large.

In this state, the distal end pairs 22 and the lead-side distal end portions 23 are inserted into the positioning tool 4.

For example, it is possible to perform the insertion by fitting the positioning tool 4 having the drive mechanism 16 shown in FIG. 2 integrally, to the stator core 18 shown in FIG. 1 from the upper side thereof.

After the distal end pairs 22 and the lead-side distal end portions 23 are inserted into the respective insertion holes of the plate bodies 36, 42 of the positioning tool 4 and the positioning tool 4 is placed on the upper surface of the base member 10, the driving screw 56 of the driving mechanism 16 is rotated such that the region in which the insertion holes of the plates overlap with each other is narrowed. FIG. 6 shows a state after the rotation, i.e. after the positioning is completed.

The insertion operation and the positioning operation of the distal end pairs 22 or the like will be described with reference to FIG. 7A and FIG. 7B, regarding the insertion hole 62*b* as a representative.

FIG. 7A shows a state where a distal end pair 22 (distal end portions 22*a*, 22*b*) is inserted into the insertion hole 62*b* and the corresponding insertion hole 62*b*' while the region in which the insertion hole 62*b* and the corresponding insertion hole 62*b*' overlap with each other is large. Since the position of each distal end pair 22 has been adjusted, the distal end pair 22 can be inserted within the region in which the insertion hole 62*b* and the corresponding insertion hole 62*b*' overlap with each other, with a margin.

In this state, usually there is a positional deviation d1 in the circumferential direction of the core 20 and a gap d2 in the radial direction between the distal end portion 22*a* and the distal end portion 22*b* of the segments. If the distal end portion 22*a* and the distal end portion 22*b* are connect by welding in this state, the welding quality will be low and problems are likely to be caused, and thus the positioning is performed. Conversely, since a precise positioning using the positioning tool 4 is performed after the above state, when inserting the distal end pairs 22 to the insertion holes 62*b* and the corresponding insertion holes 62*b*', it is sufficient if positions of the respective distal end portions 22*a*, 22*b* are adjusted to an extent that the insertion is possible, even if the accuracy of the adjustment is only at a degree that allows the positional deviation d1 and the gap d2. Incidentally, the adjustment of positions of the respective distal end portions 22*a*, 22*b* includes not only the adjustment of the relative positions between the respective distal end portions 22a, 22b, but also the alignment between the distal end pairs 22 and the insertion holes 62b and the corresponding insertion holes 62b' configured to accept insertion of the distal end pairs 22.

Next, when the drive screw 56 shown in FIG. 2 is rotated and thereby the first plate 6 and the second plate 8 are rotated in opposite directions to each other as indicated by arrows R1 and R2, respectively, as shown in FIG. 7B, the region in which the insertion hole 62b and the corresponding insertion hole 62b' overlap with each other is gradually narrowed, and the distal end portions 22a, 22b are pressed radially and circumferentially by the tapered surfaces 62b-1 of the insertion hole 62b and the tapered surfaces 62b'-1 of the corresponding insertion hole 62', thereby the gap d2 in the radial direction is eliminated and the distal end portions 22a, 22b come into contact with each other.

Further, the distal end portions 22a and 22b are constrained by the rear end surface 62b-2 of the insertion hole 62b and the rear end surface 62b'-2 of the corresponding insertion hole 62b', thereby the distal end portions 22a and 22b are aligned to a state with no positional deviation d1 in the circumferential direction. That is, positioning of the distal end pair 22 in the circumferential direction and the radial direction is performed simultaneously.

On the other hand, FIG. 8A shows a state where a lead-side distal end portion 23 of a variant segment is inserted into the variant insertion hole 64b and the corresponding variant insertion hole 64b' while the region in which the variant insertion hole 64b and the corresponding variant insertion hole 64b' overlap with each other is large. Since the position of the lead-side distal end portion 23 has been adjusted, the lead-side distal end portion 23 can be inserted within the range in which the variant insertion hole 64b and the corresponding variant insertion hole 64' overlap with each other, with a margin. The same applies to the variant insertion hole 64a and the corresponding variant insertion hole 64a'.

As shown in FIG. 8B, the sizes of the variant insertion hole 64b and the corresponding variant insertion hole 64b' are determined such that the lead-side distal end portion 23 is not constrained even in a state where the first plate 6 and the second plate 8 are rotated in opposite directions to the positions shown in FIG. 7B to perform the positioning of the distal end pair 22. Therefore, during the positioning of the distal end pairs 22, the positions of the lead-side distal end portions 23 do not change.

That is, since the lead-side distal end portions 23 of the variant segments are not objects of the welding, it is not necessary to perform the positioning thereof. The lead-side distal end portions 23 are inserted into the first plate 6 and the second plate 8 so as not to interfere with the positioning operation of the distal end pairs 22, and are kept in a non-constrained state throughout the positioning operation of the distal end pairs 22. The reason why kept in the non-constrained state is that since parts of the lead-side distal end portions 23 at a height where other segments will be constrained are covered with an insulating film, it is intended to avoid scratches on the insulating film caused by collisions with other components, resulting in defects.

As shown in FIG. 9, distal end portions 22a, 22b constituting a distal end pair 22 are opposed to each other in the radial direction in a state after being bent though the twist operation. Therefore, a curved surface 62b-3 along the bent portion of the distal end portion 22b is formed at the lower end of the rear end surface 62b-2 of the insertion hole 62b in the plate body 36 of the first plate 6 located closer to the core 20 among the first plate 6 and the second plate 8, so that the positioning is not inhibited at the bent portion of the distal end portion (here, the distal end portion 22b) constituting the distal end pair 22. That is, in the inner periphery of the insertion hole 62b, the rear end surface 62b-2 extends backward with respect to the rotational direction R1 of the first plate 6 during the positioning operation. Therefore, the bent portion of the distal end portion 22b does not interfere with the insertion hole 62b, and thus the positioning operation is not hindered.

The same applies to the insertion holes 62a and 62c.

As described above, in the positioning method of the distal end portions of the coil segments in the present embodiment, as an example, as shown in FIG. 10, during the twist processing of the distal end portions of the coil segments or after the twist processing, the positions of the twisted distal end pairs 22 are roughly adjusted to an extent that the twisted distal end pairs 22 can be inserted into the insertion holes of the first plate 6 and the second plate 8 (S11), and then the twisted distal end pairs 22 are inserted into the insertion holes 62 of the first plate 6 and the corresponding insertion holes 62' of the second plate 8 (S12). At this time, the lead-side distal end portions 23 are inserted into the variant insertion holes 64 of the first plate 6 and the corresponding variant insertion holes 64' of the second plate 8. Thereafter, the first plate 6 and the second plate 8 are rotated by the drive mechanism 16 in different directions, respectively, to narrow the region in which the insertion holes 62 of the first plate 6 and the corresponding insertion holes 62' of the second plate 8 overlap with each other, thereby the positioning of the distal end pair 22 is performed (S13).

According to this method, since the distal end pair 22 is inserted into each insertion hole in a state where the positions of the distal end portions thereof are aligned in step S11, it is possible to easily insert the distal end pairs 22 into the insertion holes pair by pair.

Further, since the insertion holes formed in the first plate 6 and the second plate 8 are independent of one another, the ratios of openings of the insertion holes to the areas of the plates are smaller than those in the apparatus shown in PTL1, and therefore the mechanical strength of the first plate 6 and the second plate 8 can be increased.

Further, since the positions of the distal end pairs can be adjusted to a certain position at which the distal end pairs can be inserted into the insertion holes while the first plate 6 and the second plate 8 are not present, with easy access to the distal end portions of the coil segments, the work is easy, and the working efficiency of the positioning operation can be improved as a result.

The above embodiment shows an example of a positioning tool having both of insertion holes for accepting insertion of distal end pairs of ordinary segments and insertion holes for accepting insertion of distal end portions of variant segments. Hereinafter another example of the positioning tool having only insertion holes for accepting insertion of distal end pairs of ordinary segments will be described with reference to FIG. 11 and FIG. 12.

In this embodiment, the variant segment protrudes from the other end surface of the core on the opposite side to an end face side from which the ordinary segments protrude. Therefore, the segments on the side where the positioning is performed is only the ordinary segments, and the variant insertion holes are not necessary.

FIG. 11 is a plan view of an annular plate body 66 to be fixed by screws on the upper surface of the inner side ring of the first plate. In FIG. 11, the reference numeral 66a denotes a screw insertion hole.

In the plate body 66, insertion holes 68 each configured to separately accept insertion of one of the distal end pairs 22 are formed in lines along the circumferential direction of the core 20 to form a plurality of rows (four rows here) in the radial direction of the core 20. In this example, the number of distal end portions of the coil segments inserted into one slot of the core 20 is eight.

The Insertion holes 68 includes, in order from the radially inner side of the core 20 toward the outer side, four types of the insertion holes 68a, 68b, 68c, and 68d. These insertion holes are in similar shapes, and the radial width and the circumferential width are gradually increased from the inner side ones toward the outer side ones. This is based on the difference in the amount of displacement in the circumferential direction due to the rotation depending on the radial position.

The insertion holes 68a, 68b, 68c, 68d have, as in the case of FIG. 3 and FIG. 4, a tapered shape such that the width in the radial direction gradually narrows on the rear end side along the rotational direction (R1 direction) of the plate body 66 at the time of the positioning.

FIG. 12 is a plan view of an annular plate body 70 to be fixed by screws on the upper surface of the outer side ring of the second plate. In FIG. 12, the reference numeral 70a denotes a screw insertion hole, and 70b denotes an elongated hole in which the heads of the screws fixing the plate body 66 of the first plate can move.

In the plate body 70, corresponding insertion holes 68' (68a', 68b', 68c', 68d') respectively corresponding to the insertion holes 68 (68a, 68b, 68c, 68d) of the plate body 66 are formed.

The plate body 70 is disposed on the upper surface of the plate body 66 so as to overlap with the plate body 66 in the axial direction of the core 20, and is used in the same manner as the embodiment described with reference to FIG. 1 to FIG. 10. The positioning function or the like by narrowing the region in which the insertion holes and the corresponding insertion hole overlap with each other is the same as that of the embodiment, and therefore the description thereof is omitted.

In each of the above embodiments, the plate bodies are in an annular shape having an open center portion, but the plate bodies may be a disk shape. Further, as long as the insertion holes for accepting insertion of the distal end portions of the coil segments, which are objects of the positioning, can be formed, a member having a shape other than the plate shape can be used instead of the first plate and the second plate.

Preferred embodiments of the present invention are described above. However, the present invention is not limited to such specific embodiments, and various modifications and variations are conceivable.

For example, although a configuration in which the width of the insertion holes 62 and the corresponding insertion holes 62' are gradually narrowed on the rear end side along the rotational direction is described in the embodiment above, this is not essential, and the insertion holes may have substantially the same width over the entire length in the rotational direction. In this case, the positioning of the distal end pair 22 cannot be performed in the radial direction by the rotation of the first plate 6 and the second plate 8, but the positioning in the circumferential direction can be performed in the same manner as in the above-described embodiment.

Also, the curved surface 62b-3 shown in FIG. 9 is not essential.

Further, it is not essential to move both the first plate 6 and the second plate 8 during the positioning operation. Even with a configuration in which one of the first plate 6 and the second plate 8 is fixed and the other is moved, when the relative positional relationship between the first plate 6 and the second plate 8 is changed in a direction rotating around the axis of the core 20 through the above movement, and the region in which the insertion holes 62 and the corresponding insertion holes 62' overlap with each other in the axial direction of the core 20 can be narrowed, and thereby the positioning substantially the same as in the case of the embodiment described above can be performed.

However, since some gaps are required when inserting the distal end pairs into the insertion holes of each plate, if the positioning is performed by moving only one of the first plate 6 and the second plate 8, positions of the distal end pairs 22 will be shifted in the circumferential direction of the core 20 by the amount of the gap due to the positioning. If the positioning is performed by moving both the first plate 6 and the second plate 8, such movement can be prevented, which is more preferable.

The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST

2 . . . positioning apparatus, 4 . . . positioning tool, 6 . . . first plate, 8 . . . second plate, 12 . . . first operable member, 14 . . . second operable member, 16 . . . drive mechanism, 20 . . . core, 22 . . . distal end pair, 22a, 22b . . . distal end portion of coil segment, 23 . . . lead-side distal end portion, 62, 62a, 62b, 62c . . . insertion hole, 62', 62a', 62b', 62c' . . . corresponding insertion hole, 64, 64a, 64b . . . variant insertion hole, 64', 64a', 64b' . . . corresponding variant insertion hole

The invention claimed is:

1. A coil segment positioning method for positioning a plurality of distal end pairs of coil segments protruding from an end face of a core, each of the distal end pairs being constituted by a pair of distal end portions facing each other in a radial direction of the core among distal end portions of the coil segments, the method comprising:
preparing a first member with first insertion holes each configured to separately accept insertion of one of the distal end pairs, the first insertion holes being arranged in lines along a circumferential direction of the core to form a plurality of rows in the radial direction, and a second member with second insertion holes corresponding to the first insertion holes of the first member;
inserting the distal end pairs with positions thereof adjusted to an extent that the distal end pairs can be inserted into the first insertion holes and the second insertion holes, into the first insertion holes of the first member and the second insertion holes of the second member, the second member being disposed to overlap with the first member in an axial direction of the core; and
aligning positions, in the circumferential direction, of the distal end portions constituting the distal end pairs inserted into the first insertion holes and the second insertion holes, by rotating the first member and/or the second member around an axis of the core to narrow a region in which the first insertion holes and the second insertion holes overlap with each other in the axial direction of the core, wherein one or more stand-alone distal end portions not constituting the distal end pairs are included in the distal end portions of the coil segments protruding from the end face of the core, one or more third insertion holes each configured to accept insertion of one of the stand-alone distal end portions are formed on the first member, and one or more fourth insertion holes each configured to accept insertion of one of the stand-alone distal end portions are formed on the second member, when inserting the distal end pairs with positions thereof adjusted, into the first insertion holes and the second insertion holes, the stand-alone distal end portions are inserted into the third insertion holes and the fourth insertion holes, and positions of the stand-alone distal end portions are not affected by the rotation of the first member and/or the second member.

2. The coil segment positioning method according to claim 1, wherein the first member and the second member are rotated in opposite directions to each other to narrow the region in which the first insertion hole and the second insertion hole overlap with each other in the axial direction of the core.

3. The coil segment positioning method according to claim 1, wherein at least either of the first insertion holes and the second insertion holes are formed such that widths of the at least either insertion holes, in the radial direction, are narrower on rear sides thereof in a direction of rotation of said at least either insertion holes according to the rotation of the first member and/or the second member than on front sides thereof in the direction of the rotation, and when aligning the positions, in the circumferential direction, of the distal end portions constituting each distal end pair by the rotating of the first member and/or the second member, the aligned distal end portions are brought into contact with each other in the radial direction.

4. A coil segment positioning method for positioning a plurality of distal end pairs of coil segments protruding from an end face of a core, each of the distal end pairs being constituted by a pair of distal end portions facing each other in a radial direction of the core among distal end portions of the coil segments, the method comprising:

preparing a first member with first insertion holes each configured to separately accept insertion of one of the distal end pairs, the first insertion holes being arranged in lines along a circumferential direction of the core to form a plurality of rows in the radial direction, and a second member with second insertion holes corresponding to the first insertion holes of the first member;

inserting the distal end pairs with positions thereof adjusted to an extent that the distal end pairs can be inserted into the first insertion holes and the second insertion holes, into the first insertion holes of the first member and the second insertion holes of the second member, the second member being disposed to overlap with the first member in an axial direction of the core; and aligning positions, in the circumferential direction, of the distal end portions constituting the distal end pairs inserted into the first insertion holes and the second insertion holes, by rotating at least the first member around an axis of the core to narrow a region in which the first insertion holes and the second insertion holes overlap with each other in the axial direction of the core, wherein the first member is closer to the core than the second member, and wherein inner surfaces of the first insertion holes include curved surfaces that extend backward, on a side closer to the core, with respect to a direction of rotation of the first member in the rotating of the first member and the first insertion holes.

5. A coil segment positioning tool comprising:

a first member with first insertion holes each configured to separately accept insertion of one of distal end pairs each constituted by a pair of distal end portions facing each other in a radial direction of a core among distal end portions of coil segments protruding from an end face of the core, the first insertion holes being arranged in lines in a circumferential direction of the core to form a plurality of rows in the radial direction; and a second member with second insertion holes corresponding to the first insertion holes of the first member, configured to be disposed to overlap with the first member in an axial direction of the core in a state where the distal end pairs are inserted into the first insertion holes and the second insertion holes, wherein the first member and/or the second member is rotatable around an axis of the core in a direction to narrow first regions in which the first insertion holes and the second insertion holes respectively overlap with each other in the axial direction of the core, the first member comprises one or more third insertion holes each configured to accept insertion of one of one or more stand-alone distal end portions that are distal end portions not constituting the distal end pairs among the distal end portions of the coil segments protruding from the end face of the core, and the second member comprises one or more fourth insertion holes each configured to accept insertion of one of the stand-alone distal end portions, and when the first member and/or the second member is rotated to a position at which the distal end pairs inserted in the first insertion holes and the second insertions holes are constrained by the first insertion holes and the second insertions holes in the first regions, respective second regions in which the third insertion holes and the fourth insertion holes respectively overlap with each other in the axial direction of the core are larger than the first regions in length along a circumferential direction of the core.

6. The coil segment positioning tool according to claim 5, wherein both of the first member and the second member are rotatable in directions to narrow the region in which the first insertion holes and the second insertion holes overlap with each other in the axial direction of the core.

7. The coil segment positioning tool according to claim 5, wherein at least either of the first insertion holes and the second insertion holes are formed such that widths of the at least either insertion holes, in the radial direction, are narrower on rear sides thereof in a direction of rotation of said at least either insertion holes according to the rotation of the first member and/or the second member than on front sides thereof in the direction of the rotation.

8. A coil segment positioning tool comprising:

a first member with first insertion holes each configured to separately accept insertion of one of distal end pairs each constituted by a pair of distal end portions facing each other in a radial direction of a core among distal end portions of coil segments protruding from an end face of the core, the first insertion holes being arranged in lines in a circumferential direction of the core to form a plurality of rows in the radial direction; and a second member with second insertion holes corresponding to the first insertion holes of the first member, configured to be disposed to overlap with the first member in an axial direction of the core in a state where the distal end pairs are inserted into the first insertion holes and the second insertion holes, wherein at least the first member is rotatable around an axis of the core in a direction to narrow a first region in which the first insertion holes and the second insertion holes overlap with each other in the axial direction of the core, wherein the first member is configured to be positioned closer to the core than the second member when accepting the distal end pairs into the first insertion holes, and wherein inner surfaces of the first insertion holes include curved surfaces that extend backward, on a side closer to the core when accepting the distal end pairs, with respect to the direction of rotation of the first member, to narrow the first region, in the rotating of the first member and the first insertion holes.

9. A coil segment positioning apparatus, comprising:

the coil segment positioning tool according to claim 5; and a drive source configured to drive the first member and the second member to rotate the first member and the second member in different directions, respectively.

10. A coil segment positioning apparatus, comprising:

the coil segment positioning tool according to claim 5;

a first operable member formed on the first member;

a second operable member formed on the second member; and a drive mechanism configured to rotate the first member and the second member in the different directions by moving the first operable member and the second operable member closer to each other or away from each other.

* * * * *